United States Patent Office 3,102,039
Patented Aug. 27, 1963

3,102,039
COLOR RESTORING CONCRETE BODY
Hermann Manecke, Bremen, Germany, assignor to Klockner-Werke Aktiengesellschaft
No Drawing. Filed Nov. 3, 1958, Ser. No. 771,354
Claims priority, application Germany Nov. 6, 1957
10 Claims. (Cl. 106—97)

The present invention relates to a color restoring concrete body, and more particularly, it relates to a substantially white, solid concrete body which upon exposure to atmospheric conditions will, after soiling, automatically restore its white or whitish color.

The present invention is particularly useful in connection with concrete bodies embedded in road coverings and the like for the purpose of permanently marking and designating certain areas such as the border lines of pedestrian crossings, or for forming a cross hatched pattern, like a warning strip beyond which vehicles must not pass. It is, of course, important that such road markings and the like can withstand the very considerable wear and tear to which the same are exposed. Thus, painting of strips and the like onto the road surface, as well as embedding colored or white tape in the road surface, will require frequent repair and replacement. In this connection, it is noteworthy that in addition to the mechanical wear and tear to which the road surface and any markings thereon are exposed, chemical attack will also occur, particularly when during freezing weather salt is spread thereon in order to melt ice formations.

It has been found that white concrete possesses the desired resistance to such mechanical and chemical attack.

White concrete made, for instance, of a mixture of 1 part by weight of white Portland cement and 3⅓ parts by weight of aggregate of the following composition:

1 part by weight white limestone sand, particle size 0-2 mm.,
1 part by weight white sand derived from hard rock, particle size 0-3 mm., and
1 part by weight white hard rock gravel, particle size 3-7 mm., has been found to be suitable for this purpose. However, the initial white color of such concrete bodies is quickly darkened and eventually disappears due to the adherence of dust and dirt particles to the concrete surface. Attempts to reduce the susceptibility of the white concrete to darkening by increasing the density thereof, particularly by addition of aluminum stearate have not met with the desired success.

It is therefore an object of the present invention to provide a white concrete which upon being soiled and exposed to atmospheric conditions, i.e. to moisture, will possess self-cleaning qualities.

It is another object of the present invention to provide a white, solid concrete body capable of automatically reconstituting its white surface by covering any adhering dirt particles and the like with white material originally contained in the concrete body.

Other objects and advantages of the present invention will become apparent from a further reading of the description and of the appended claims.

With the above and other objects in view, the present invention mainly comprises a substantially white, solid concrete body formed of substantially white cement and of substantially white aggregate, the concrete body including as an essential constituent thereof and finely distributed therethrough a predetermined quantity of titanium dioxide, this predetermined quantity of titanium dioxide being so chosen that upon exposure of the concrete body to moist atmospheric conditions, a titanium dioxide suspension will be formed covering the free surface of the concrete body including any foreign matter adhering thereto, whereby due to the titanium dioxide covering, the white color of the concrete body will be preserved.

Thus, according to the present invention the white concrete body, which may be an entire concrete body, or which may be only the white surface portion of a concrete body having another portion not necessarily of white color, is produced in a generally known manner of white Portland cement and of white aggregates, with the addition of titanium dioxide in a quantity sufficient to form, under atmospheric conditions, particularly under the influence of rain water a suspension which will cover any dirt particles or the like adhering to the white concrete surface.

Preferably, the quantity of titanium dioxide is at least equal to 3% of the weight of the entire aggregate, and excellent results have been obtained with an addition of titanium dioxide equal to between 5 to 7% of the weight of the entire aggregate.

Furthermore, it has been found that particularly good results are obtained by including in the concrete a titanium dioxide obtained from anatase.

The titanium dioxide is to be added in finely subdivided form and is to be intimately mixed into the remainder of the concrete mixture. In this manner, it is achieved, according to the present invention, that upon contact of the concrete surface with, for instance, rain water, a suspension is formed which contains colloidal particles of titanium dioxide. Apparently, such suspending of titanium dioxide under atmospheric conditions is due to hydrate formation, since generally rain water has a slightly acid reaction due to carbon dioxide dissolved therein.

The thus formed titanium dioxide suspension will cause—particularly in titanium dioxide concentration of between 3–7.5%, and preferably of between 5–7.5%—wetting and covering of dirt particles with the suspension, whereby the white color of the concrete surface is maintained and the same will become even lighter when the road surface has become dry again. In this manner, the otherwise unavoidable eventual darkening of the white surface can be successfully overcome.

A titanium dioxide suspension is, of course, also formed when the relative quantity of titanium dioxide in the concrete is less than the above indicated preferred quantities. However, in such case, due to the low concentration of titanium dioxide, the suspending of the titanium dioxide proceeds so strongly that the suspension and thus the titanium dioxide passes outwardly of the surface layer of the concrete body and might be washed away at least partially. In any event, the suspended titanium dioxide is in such cases not fully available for adhering to the surface of the concrete body and, thus, for effecting the "self-cleansing" action which is more fully achieved within the above indicated ranges of titanium dioxide concentration.

In dry weather, or dry climates, it is of course also possible to activate the self-cleansing properties of the concrete body according to the present invention by moistening the same with slightly acidified water. While in the illustrated embodiment only a portion of the concrete body is formed according to the present invention with the addition of titanium dioxide it is, of course, possible to produce concrete bodies which throughout contain titanium dioxide, and it is, of course, also possible to produce concrete bodies according to the present invention in any desired shape and size.

The following examples of concrete compositions, according to the present invention, are given as illustrative only, the invention, however, not being limited to the specific details of the examples.

Example I

Block-shaped concrete bodies having a width of 9.5 cm., a length of 19.5 cm., and a height of 8.5 cm. are to be formed with a white concrete surface portion, according to the present invention, having a height of 1 cm., and an underlying regular concrete portion having a height of 7.5 cm.

The concrete for the white surface portion is produced from a mixture containing 1 part by weight of white Portland cement
0.3 part by weight of titanium dioxide "A"
1.0 part by weight of white aggregate (white Grenette) particle size 0.2–1 mm.
1.5 part by weight of white aggregate (white Grenette) particle size 1–3 mm.
1.5 part by weight of white aggregate (white Grenette) particle size 3–10 mm.

The quantity of titanium dioxide is equal to 7.5% of the weight of the aggregate or equal to 6% of the combined aggregate and cement dry solids.

The concrete mass is produced by stirring the titanium dioxide with the required quantity of mixing water. The thus formed suspension is then mixed with the Portland cement and the aggregate in conventional manner so as to form a plastic concrete mass which is introduced into a mold corresponding to the dimensions of the concrete brick. The thus introduced white concrete mass is then compacted under vibration in a manner well known in the art so as to form on the bottom of the mold a compacted layer having a height of 1 cm. After thus thoroughly compacting the white concrete mass layer, the mold is completely filled with conventional concrete mass which is then hydraulically compacted in conventional manner.

After solidification, the thus formed concrete body having a white surface portion or layer, according to the present invention, is removed from the mold.

Example II

Concrete bricks having a width of 12.5 cm., a length of 25 cm. and a height of 10 cm. are formed with a white surface portion, according to the present invention, having a thickness of 1.5 cm., the underlying conventional concrete portion thus having a thickness of 8.5 cm.

The underlying concrete is formed of 1 part by weight of Portland cement and 4 parts by weight of fine gravel of substantially even particle size.

The white concrete surface layer is formed of 1.0 part by weight of white Portland cement
0.25 part by weight of titanium dioxide "A"
1.5 parts by weight of white aggregate (white Grenette) particle size 0.2–1 mm.
0.5 part by weight of white aggregate (white Grenette) particle size 1–3 mm.
1.0 part by weight of white aggregate (white Grenette) particle size 3–7 mm.
1.0 part by weight of white aggregate (white Grenette) particle size 7–15 mm.

The quantity of titanium dioxide is equal to 6.25% of the weight of the aggregate or equal to 5% of the combined cement and aggregate dry solids.

The brick is then formed in the manner described in Example I.

Example III

A concrete body having a width of 50 cm., a length of 70 cm. and a height of 8 cm. is formed with a white surface portion having a height of 0.7 cm. and an underlying conventional concrete portion having a thickness of 7.3 cm., in the manner described in Example I, using the following mixtures:

For the underlying conventional concrete portion:

1 part by weight of Portland cement
4 parts by weight of fine gravel

The white concrete surface layer is formed of 1.0 part by weight of white Portland cement
0.2 part by weight of titanium dioxide "A"
1.2 parts by weight of white aggregate (white Grenette) particle size 0.2–1 mm.
1.2 parts by weight of white aggregate (white Grenette) particle size 1–3 mm.
1.6 parts by weight of white aggregate (white Grenette) particle size 3–7 mm.

The quantity of titanium dioxide is equal to 5% of the weight of the aggregate or equal to 4% of the combined aggregate and cement dry solids.

Titanium dioxide "A" is the anatase crystalline modification of titanium dioxide.

Titanium dioxide "A," mentioned in the examples, is a commercial titanium dioxide, having a size varying from 0.0003 mm.–0.001 mm. (mm.=millimeters).

The white aggregate (white Grenette) consists of a calcined flint stone, e.g. a calcined flint stone known in Europe under the trademark "Luxowit."

The gravel for the underlying concrete may be composed of the following particle size percentages:

| | Percent |
|---|---|
| 0–0.2 mm. | 2 |
| 0.2–1 mm. | 10 |
| 1–3 mm. | 18 |
| 3–7 mm. | 20 |
| 7–15 mm. | 20 |
| 15–30 mm. | 30 |

Any other suitable composition of gravel components may be used, as it is known in this art.

It is supposed that the particular advantages of the titanium dioxide "A" are due to the special crystalline structure of this modification.

Maintaining the aggregate:cement ratio at 4:1 as described in Examples I–III, but reducing the proportion of titanium dioxide relative to the aggregate to 3% as described further above, will result in a concrete in which the addition of titanium dioxide equals 2.4% of the combined weight of the aggregate and cement solids.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. As part of a road covering, a solid concrete body consisting essentially of a minor proportion of a substantially white hydraulic cement and of a major proportion of substantially white aggregate more than half of said aggregate having a particle size of at least about 1 mm. and an effective fraction thereof having a particle size of at least 3 mm., said concrete body including as an essential constituent thereof and finely distributed therethrough titanium dioxide in an amount equal to between 2.4% and 6% of the combined aggregate and cement dry solids of said concrete body, whereby upon exposure of said concrete body to moist atmospheric conditions, a titanium dioxide suspension will be formed covering the free surface of said concrete body including any foreign matter adhering thereto, and whereby due to said titanium dioxide covering, the white color of said concrete body will be preserved.

2. A solid concrete body adapted to form at least a portion of a road covering and to serve as a road marking device, said solid concrete body consisting essentially of substantially white Portland cement and of substantially white aggregate in an amount equal to between about 3⅓ times and 4 times the amount of Portland cement, more than half of said aggregate having a particle size of at least about 1 mm. and an effective fraction thereof having a particle size of at least 3 mm., said concrete body including as an essential constituent thereof and finely distributed therethrough titanium dioxide in an amount equal to between 2.4% and 6% of the combined aggregate and cement dry solids of said concrete body, whereby upon exposure of said concrete body to moist atmospheric conditions, a titanium dioxide suspension will be formed covering the free surface of said concrete body including any foreign matter adhering thereto, and whereby due to said titanium dioxide covering, the white color of said concrete body will be preserved.

3. A solid concrete body adapted to form at least a portion of a road covering and to serve as a road marking device, said solid concrete body consisting essentially of substantially white Portland cement and of substantially white aggregate in an amount equal to between about 3⅓ times and 4 times the amount of Portland cement, more than half of said aggregate having a particle size of at least about 1 mm. and an effective fraction thereof having a particle size of at least 3 mm., said concrete body including as an essential constituent thereof and finely distributed therethrough titanium dioxide in an amount equal to between 4% and 6% of the combined aggregate and cement dry solids of said concrete body, whereby upon exposure of said concrete body to moist atmospheric conditions, a titanium dioxide suspension will be formed covering the free surface of said concrete body including any foreign matter adhering thereto, and whereby due to said titanium dioxide covering, the white color of said concrete body will be preserved.

4. A solid concrete body adapted to form at least a portion of a road covering and to serve as a road marking device, said solid concrete body consisting essentially of substantially white Portland cement and of substantially white aggregate in an amount equal to between about 3⅓ times and 4 times the amount of Portland cement, more than half of said aggregate having a particle size of at least about 1 mm. and an effective fraction thereof having a particle size of at least 3 mm., said concrete body including as an essential constituent thereof and finely distributed therethrough titanium dioxide in an amount equal to about 4% of the combined aggregate and cement dry solids of said concrete body, whereby upon exposure of said concrete body to moist atmospheric conditions, a titanium dioxide suspension will be formed covering the free surface of said concrete body including any foreign matter adhering thereto, and whereby due to said titanium dioxide covering, the white color of said concrete body will be preserved.

5. A solid concrete body adapted to form at least a portion of a road covering and to serve as a road marking device, said solid concrete body consisting essentially of substantially white Portland cement and of substantially white aggregate in an amount equal to between about 3⅓ times and 4 times the amount of Portland cement, more than half of said aggregate having a particle size of at least about 1 mm. and an effective fraction thereof having a particle size of at least 3 mm., said concrete body including as an essential constituent thereof and finely distributed therethrough titanium dioxide in an amount equal to about 5% of the combined aggregate and cement dry solids of said concrete body, whereby upon exposure of said concrete body to moist atmospheric conditions, a titanium dioxide suspension will be formed covering the free surface of said concrete body including any foreign matter adhering thereto, and whereby due to said titanium dioxide covering, the white color of said concrete body will be preserved.

6. A solid concrete body adapted to form at least a portion of a road covering and to serve as a road marking device, said solid concrete body consisting essentially of substantially white Portland cement and of substantially white aggregate in an amount equal to between about 3⅓ times and 4 times the amount of Portland cement, more than half of said aggregate having a particle size of at least about 1 mm. and an effective fraction thereof having a particle size of at least 3 mm., said concrete body including as an essential constituent thereof and finely distributed therethrough titanium dioxide in an amount equal to about 6% of the combined aggregate and cement dry solids of said concrete body, whereby upon exposure of said concrete body to moist atmospheric conditions, a titanium dioxide suspension will be formed covering the free surface of said concrete body including any foreign matter adhering thereto, and whereby due to said titanium dioxide covering, the white color of said concrete body will be preserved.

7. For use as a road marking device, a solid concrete body comprising a main portion and a surface portion integral with each other, said surface portion of said solid concrete body consisting essentially of substantially white Portland cement and of substantially white aggregate in an amount equal to between about 3⅓ times and 4 times the amount of Portland cement, more than half of said aggregate having a particle size of at least about 1 mm. and an effective fraction thereof having a particle size of at least 3 mm., said concrete body including as an essential constituent thereof and finely distributed therethrough titanium dioxide in an amount equal to between 2.4% and 6% of the combined aggregate and cement dry solids of said surface portion of said concrete body, whereby upon exposure of said surface portion of said concrete body to moist atmospheric conditions, a titanium dioxide suspension will be formed covering the free surface of said portion including any foreign matter adhering thereto, and whereby due to said titanium dioxide covering, the white color of said surface portion of said concrete body will be preserved.

8. A solid concrete body adapted to form at least a portion of a road covering and to serve as a road marking device, said solid concrete body consisting essentially of one part by weight of white Portland cement; about one part by weight of white aggregate having a particle size of between about 0.2 and 1 mm.; about one and a half parts by weight of white aggregate having a particle size of between 1 and 3 mm.; about one and a half parts by weight of white aggregate having a particle size of between 3 and 10 mm.; and about 0.3 part by weight of titanium dioxide, whereby upon exposure of said concrete body to moist atmospheric conditions, a titanium dioxide suspension will be formed covering the free surface of said concrete body including any foreign matter adhering thereto, and whereby due to said titanium dioxide covering, the white color of said concrete body will be preserved.

9. A solid concrete body adapted to form at least a portion of a road covering and to serve as a road marking device, said solid concrete body consisting essentially of one part by weight of white Portland cement; about one and a half parts by weight of white aggregate having a particle size of between about 0.2 and 1 mm.; about one half part by weight of white aggregate having a particle size of between 1 and 3 mm.; about one part by weight of white aggregate having a particle size of between 3 and 7 mm.; about one part by weight of white aggregate having a particle size of between 7 and 15 mm.; and about 0.25 part by weight of titanium dioxide, whereby upon exposure of said concrete body to moist atmospheric conditions, a titanium dioxide suspension will be formed covering the free surface of said concrete body including any foreign matter adhering thereto, and whereby due to said titanium dioxide covering, the white color of said concrete body will be preserved.

10. A solid concrete body adapted to form at least a portion of a road covering and to serve as a road marking device, said solid concrete body consisting essentially of one part by weight of white Portland cement; about 1.2 parts by weight of white aggregate having a particle size of between about 0.2 and 1 mm.; about 1.2 parts by weight of white aggregate having a particle size of between about 1 and 3 mm.; about 1.6 parts by weight of white aggregate having a particle size of between about 3 and 7 mm.; and about 0.2 part by weight of titanium dioxide, whereby upon exposure of said concrete body to moist atmospheric conditions, a titanium dioxide suspension will be formed covering the free surface of said concrete body including any foreign matter adhering thereto, and whereby due to said titanium dioxide covering, the white color of said concrete body will be preserved.

References Cited in the file of this patent

UNITED STATES PATENTS

| | | |
|---|---|---|
| 1,830,872 | Ellis | Nov. 10, 1931 |
| 1,986,591 | Meyer | Jan. 1, 1935 |
| 2,184,492 | French | Dec. 26, 1939 |
| 2,366,715 | French | Jan. 9, 1945 |
| 2,733,995 | Robinson | Feb. 7, 1956 |
| 2,836,502 | Bartoli et al. | May 27, 1958 |
| 2,865,266 | Wynn | Dec. 23, 1958 |
| 2,901,368 | Newell et al. | Aug. 25, 1959 |

FOREIGN PATENTS

| | | |
|---|---|---|
| 763,588 | France | May 3, 1934 |
| 438,829 | Italy | Aug. 27, 1948 |

OTHER REFERENCES

Lea et al.: "The Chemistry of Cement and Concrete" (2nd edition, 1956), pages 336 and 337.